Dec. 8, 1942.      E. E. HANS      2,304,642
AUTOMOBILE AIR CONDITIONING UNIT
Filed Aug. 1, 1939      4 Sheets-Sheet 2

INVENTOR
Edmund E. Hans.
BY Edwin C. McRae
ATTORNEY

Dec. 8, 1942.  E. E. HANS  2,304,642
AUTOMOBILE AIR CONDITIONING UNIT
Filed Aug. 1, 1939  4 Sheets-Sheet 4

INVENTOR
Edmund E. Hans
BY Colvin C. McRae
ATTORNEY

UNITED STATES PATENT OFFICE 2,304,642

AUTOMOBILE AIR CONDITIONING UNIT

Edmund E. Hans, Detroit, Mich.

Application August 1, 1939, Serial No. 287,806

14 Claims. (Cl. 237—12.3)

The object of my invention is to provide an air conditioning unit especially adapted for use in closed type automobiles.

A further object of my invention is to provide an automobile air conditioning unit which will condition all of the air in the car; that is, both the front and rear compartments of the car will be maintained at the same temperature. An important feature of this unit is that duct work or other built-in equipment is unnecessary to provide uniform ventilation in all parts of the car. My improved unit is readily attached to the dashboard of the car within the passenger compartment and all valves, thermostats, controls, etc. associated with or required to operate the unit are directly fixed thereto. This unit has the advantage over the units heretofore provided in that formerly thermostats and other controls were required in the rear portion of the body. The installation of these accessories in an ordinary automobile was exceedingly difficult.

My improved air conditioning system normally functions to draw in fresh air through an opening in the cowl of the car, a portion of the air so drawn being heated by means of a radiator and then ejected at relatively high velocity along the floor of the car to the rear portion thereof. The remainder of the air drawn in through the cowl is forced upwardly and rearwardly along the roof of the car. Both the heated air and the cold air jets are kept away from the passengers so that no appreciable draft is noticed. Both streams of air, after reaching the rear of the car, are dissipated through the doors and window guides. Even the most expensive cars are not sufficiently air tight to offer any appreciable resistance to the discharge of used air from the car.

The purpose of blowing unheated air along the roof of the car is that when outside air is heated by the conventional automobile heater, it loses its freshness and becomes dry, stale and unhealthful. My improved unit introduces a stream of unheated air over the heads of the occupants and along the upper sides of the windows, reaching the breathing height of the passengers. However, the main body of the air so introduced is not noticeable in the form of a draft, as it follows close to the roof of the car. Furthermore, the occupants of the car do not have the sensation of being cold, as the car is being adequately heated by air which has been forced through the radiator and which is directed along the floor of the car.

One cubic foot of air at 10° F. and 50% relative humidity has .39 grains of moisture present. When this amount of air is heated to 70%, the relative humidity drops to 9% and feels very dry. Such air is not satisfactory to breathe but is satisfactory if used only for heating the body. My improved system utilizes heated dry air for maintaining body temperature but supplies air which is only tempered at the breathing level.

There are many problems encountered in the air conditioning of automobiles not involved in the air conditioning of houses or buildings. For example, a building is stationary and is only subject to normal wind velocity. Furthermore, the direction in which the wind is blowing against the building usually has very little effect upon the total radiation caused thereby, as all sides of the building are usually equally insulated. Furthermore, buildings which are to be air conditioned are generally constructed so that the windows are comparatively weather tight. In an automotive vehicle the windows and doors are far from being weather tight, this being the customary manufacturing procedure required to eliminate squeaks and rattles which invariably result where close fits are attempted between these parts. Furthermore, a vehicle may be driven either into the wind or with the wind, resulting in a distinct variation in temperature. It is thus necessary that an ideal air conditioning unit for motor vehicles must be capable of supplying sufficient heat to maintain the car at body temperature, even when it is being driven at high speeds into a stiff wind during cold weather. It must also take in sufficient fresh air so as to prevent the air in the car from becoming stale or dried out.

Coupled with these requirements, it must also be sufficiently responsive to prevent too much heat under any condition. A conventional heating system could, no doubt, be made large enough to heat a car under the above-mentioned conditions, but as soon as the car turned a corner so as to be traveling with, or transversely to, the wind, the temperature would become unbearable. These sudden changes in conditions are not encountered in house air conditioning units.

My improved control is more quickly responsive to the variable conditions encountered so as to maintain a fairly uniform car temperature. The thermostatic control used in conventional air conditioning systems is entirely inadequate to so function in an automobile because no matter where the thermostat is placed in the car, certain conditions will be encountered where the wind will force all the warm air around the thermostat, leaving other parts of the car extremely cold. My improved conditioning unit overcomes these problems by functioning to eject air at relatively high velocity, both along the floor boards and just beneath the roof of the car, and in this way counteracting the introduction of air from one side or the other.

A very close to uniform temperature is maintained in the front and rear compartments under all operating conditions of the car. This is accomplished through the use of a thermostatic control. However, the thermostat is not the governing medium for maintaining uniform heat since the thermostat responds to the temperature of the air nearest it, while air at a short distance away may be uncomfortably cold or hot. In order to maintain a uniform temperature, the air nearest the thermostat must be of the same temperature as air in the other parts of the car. I accomplish this by ejecting air from the radiator at sufficiently high velocity so that it tempers all the air in the car and maintains it at a uniform temperature.

When the temperature in the car changes, the thermostat operates either to allow more heated air to be ejected from the radiator or less, as may be required. This is a very important part of this invention, as it functions to prevent so-called cold spots in the interior of the car. The high velocity of the air traveling under the front seat, plus its volume, produces the effect of a car filled with uniformly heated air. The thermostat operates therefore in response to the variations of temperature of the whole inside of the car.

Still a further object of my invention is to provide a constant circulation of air within the car and to regulate the amount of heat supplied to the conditioner radiator in order to maintain the required temperature. In other units the maximum amount of heat available is at all times supplied to the radiator and the amount of air circulated is varied to regulate the temperature. The disadvantage of the latter construction is that in mild weather the amount of air circulated is not sufficient to remove smoke or provide the required amount of fresh air for breathing.

A further object of my invention is to provide automatically operated means whereby the car may be quickly brought up to body temperature after it has been standing out in cold weather. To accomplish this, the cowl opening through which cold air is normally taken in is kept closed at all times that the interior of the car is below 55 degrees F. At such times, the air already in the car is re-circulated through the radiator until the car attains this predetermined temperature. New air is introduced in the car only after the air already in the car has reached 55 degrees. When this temperature is reached, outside air is added to the re-circulated air and the unit begins to function in its normal manner. At such time, the air in the car is changed every minute to a minute and a half, the radiator having sufficient capacity to handle this quantity of air and to heat it to the required temperature. No special openings are provided for allowing the air introduced through the cowl to be discharged from the car, as even in the most modern cars there are sufficient openings around the windows and doors so that practically no restriction is offered to the discharge of air from the body in large amounts.

A further object of my invention is to provide an improved thermostatic control for the supply of hot water or vapor used in the radiator to insure accurate control of the supply to the radiator and the positive actuation of the various valves used in the air conditioning unit. The thermostat which I employ in my unit actuates a valve which controls a supply of vacuum from the intake manifold of the vehicle engine, the vacuum operating the controls which regulate the air and amount of heat supplied to the radiator. In the past, it has been customary to connect thermostats directly with the valves which they are to operate, but the manual force exerted by any thermostat for small temperature differences is so small that sluggish operation of the system invariably results. In my improved system the work done by the thermostat is negligible, and consequently a delicate fluctuation of the system is obtained.

Still a further object of my invention is to provide a thermostat which is sensitive to smaller variations in temperature and which is more quickly responsive to same. This increased responsiveness is obtained by means which will be more fully described in the specification.

With these and other objects in view, my invention consists in the arrangement, construction and combination of the various parts of my improved unit, as described in my specification claimed in my claims, and illustrated in the accompanying drawings, in which:

Figure 1:
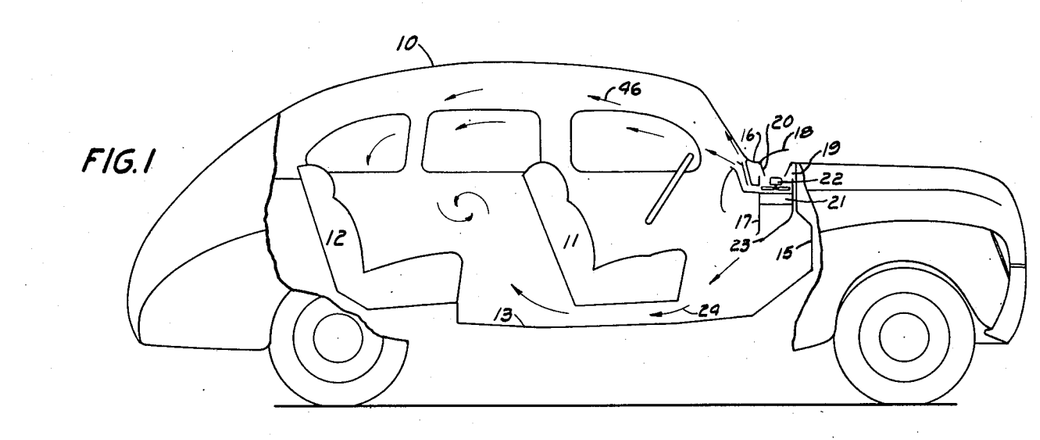
Figure 1 is a diagrammatic view, illustrating my improved unit when installed in a modern automobile.

Referring to the accompanying drawings, I have used the reference numeral 10 to indicate the body of a closed motor vehicle having front and rear seats 11 and 12, respectively, the front seat being spaced several inches above the floor 13 of the car.

An engine 14 is provided in the forward portion of the car and a conventional dash 15 separates the engine from the passenger compartment of the car. A cowl 16 is provided around the dash 15, and my improved air conditioning unit is adapted to be secured to the rear face of the dash 15 directly beneath the cowl 16.

My air conditioning unit comprises a vertically extending open ended sheet metal housing 17, the upper end of which abuts against the cowl 16. A cowl ventilator door 18 is provided over an opening in the cowl just above the housing 17, which door normally deflects fresh air into the housing 17. The door 18 functions only as a scoop or air deflector, but is shown as a door because most vehicles are provided with such a cowl ventilator door. In the normal operation of the unit, the door 18 remains in a fixed position, other means being provided for regulating the flow of air taken in through the cowl opening.

Figures 2, 3:
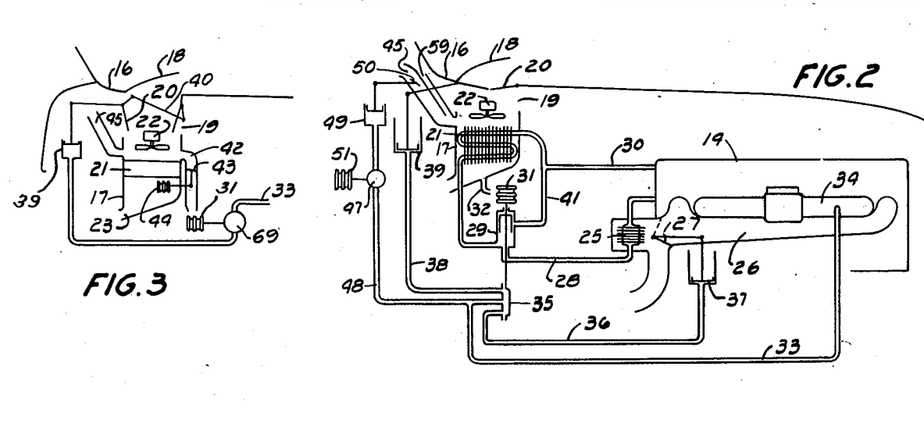
Figure 2 is a diagrammatic view, showing the operation of the preferred form of my improved unit, as shown in Figure 1.
Figure 3 is a diagrammatic view, illustrating an alternate construction wherein a thermostat is provided which functions upon the sudden introduction of cold air through the cowl ventilator to actuate the main conditioning thermostat and in this way control the proportion of fresh to re-circulated air, according to the temperature of the air at the time it leaves the radiator.

It will be noted from Figures 1 and 2 that a pair of openings 19 are provided in the opposite sides of the housing 16 just beneath the cowl, and that swinging doors 20 are hinged to the upper edges of the housing 17. When the doors are in one position, they close the openings 19, thereby permitting air to be taken in only through the cowl opening; and when they are in their other positions, the doors form a closure for the cowl ventilator and permit air to enter the housing through the openings 19. The openings 19 being inside of the car cause the air in the car to be re-circulated when the doors are in their last mentioned positions. On the other hand, when the doors are in the first mentioned positions, then all of the air which is forced through the housing 17 is drawn in through the cowl ventilator door 18. Intermediate positions of the doors proportion the amount of fresh to re-circulated air used.

A radiator core unit 21 is positioned in the intermediate portion of the housing 17 and a conventional propeller-type blower unit 22 is positioned between the cowl and the radiator core. When the blower 22 is in operation, air is drawn in through either the cowl opening or the openings 19 and is forced through the radiator core 21 so as to be discharged from the lower end of the housing 17. The lower end of the housing 17 is provided with a deflector nozzle 23 which directs the air downwardly and rearwardly beneath the front seat 11, as shown by arrows 24. The nozzle 23 projects the air at the correct angle to cause heated air to flow to the desired location. Housing 17 is of a width corresponding to that of the core 21. Nozzle 23 has an outlet opening much smaller than the core area and of rectangular shape. This restricts the flow of air at low velocity but builds up a high static pressure at high fan speed. This pressure will supply sufficient high velocity air for defrosting the windshield.

In order to supply ample heat to the radiator core 21, I have provided a generator unit 25 which is attached to the exhaust manifold 26 of the vehicle engine. The construction of this generator forms no part of this invention, as it has already been shown in my Patent 2,146,953 and other patents and applications. The generator is shown herein as forming a very satisfactory means for supplying the required heated fluid to the radiator. A control valve 27 is associated with the exhaust manifold, which in one position allows exhaust gas to flow around the generator 25, thereby heating the fluid therein and which in the other position by-passes the exhaust gas so that the generator will not absorb heat therefrom. Fluid from the engine cooling system is conducted to the generator 25 from which it flows through a hose 28 to a valve 29 associated with my conditioning unit. A hose 30 extends from the conditioning unit back to the cooling system of the engine and suitable connections are provided between the valve 29, hose 30 and core 21, so that when the valve 29 is in one position the fluid will flow from the hose 28 through the radiator core and back by means of the hose 30; and in the other position, the fluid will be by-passed directly from the valve 29 to the hose 30 by means of a by-pass 41. A bellows-type thermostat 31 is connected to the valve 29, which thermostat is positioned adjacent to the conditioning unit so as to be actuated by the temperature of the air adjacent to the unit.

One form of control is shown in Figure 2 wherein a tube 32 extends from the discharge side of the housing 17 so that a portion of the air discharged from the radiator is directed against the thermostat to make it responsive to the temperature of the air as it leaves the radiator. Air passing through conduit 32 travels along inside wall of upper housing 17, tempering the air so that it is of a lower temperature than that contained in the bottom inside of housing 17. At high speed, a greater amount of cold air is forced through conduit 32, causing valve 29 to open slightly.

To control my conditioning unit, several valves are required to be simultaneously controlled by the thermostat 31. It has been found that even with the most responsive type of thermostat obtainable sufficient power upon small temperature variations is not available to satisfactorily operate these valves. I have provided what is believed to be a unique means for operating these valves by small variations in thermostat fluctuations. I provide a plurality of piston and cylinder assemblies which are connected to the intake manifold of the engine through suitable valves so that when the thermostat moves a small amount the vacuum from the engine will move the valves to thereby immediately change the operating conditions of the unit.

Figures 6, 7, 8:
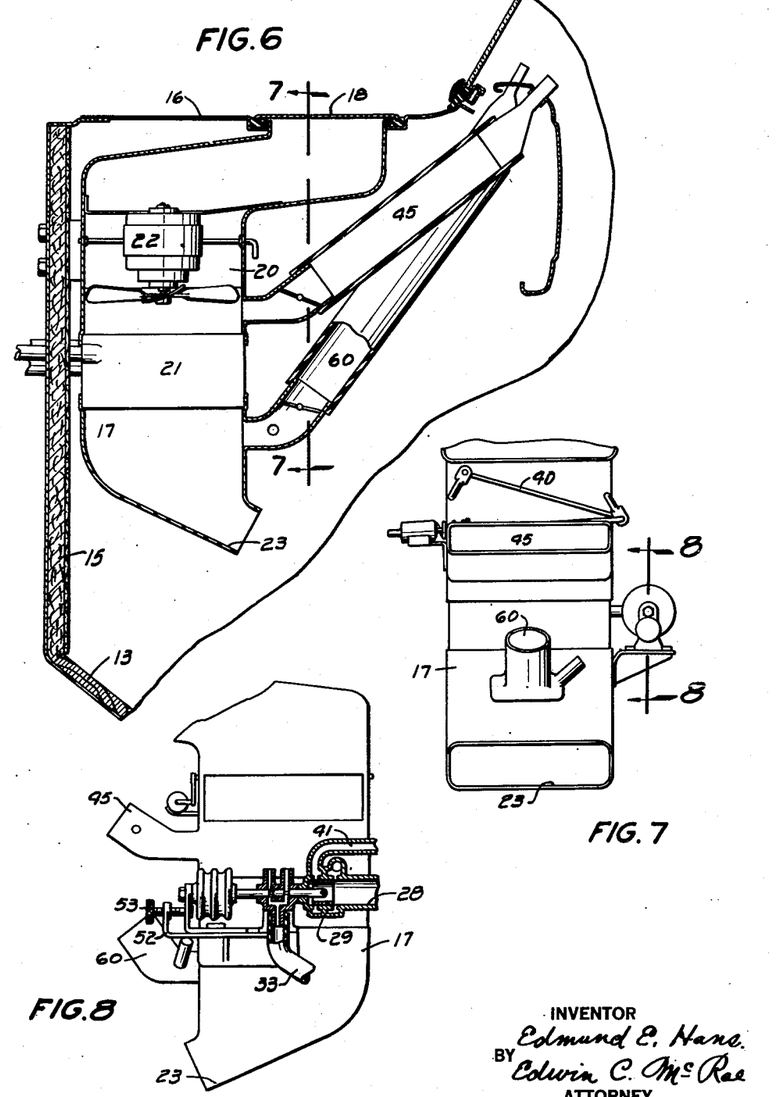
Figure 6 is a side elevation of an alternate construction in which a heater type windshield defroster is provided.
Figure 7 is a sectional view, taken upon the line 7—7 of Figure 6.
Figure 8 is a sectional view, taken upon the line 8—8 of Figure 7.

In order to accomplish this, I have provided a vacuum line 33 which extends from the engine intake manifold 34 to a valve 35 associated with my unit. The core of the valve 35 is shown in Figure 2 directly connected to the thermostat 31. A tube 36 extends from the valve 35 to a piston and cylinder unit 37 which, in turn, is manually connected to the generator valve 27. A vacuum line 38 extends from another port of the valve 35 to a piston and cylinder assembly 39 which is manually connected to the doors 20 through suitable linkage 40, as shown in Figure 7.

The operation of the device, so far described, is as follows:

When the thermostat 31 contracts, due to a drop in temperature, it moves the valve 29 to its uppermost position to thereby allow the fluid from the hose 28 to circulate through the radiator 21. The by-pass 41 is at this time closed, so that the fluid is forced through the radiator core. The thermostat is also connected to the vacuum valve 35 which, in the contracted position of the thermostat, opens the vacuum line 33 to both cylinders 37 and 39. The doors 20 thus close the cowl opening, so that the fan is only drawing in re-circulated air and the generator valve 27 is in the position where the exhaust gases supply the maximum heat to the generator.

In this position the car is warmed up in the shortest possible time.

After the temperature of the car has increased to a predetermined temperature, the thermostat 31 partially expands so as to move the valve 35 to the position where the vacuum from the line 33 is conducted only to the line 36, the piston 39 being disconnected so that the doors 20 close over the openings 19 and permit fresh air to enter through the ventilator door 18. The vacuum at this time is still connected to the line 36 so that the generator operates at its maximum efficiency.

When the temperature of the car still further increases, the thermostat expands to its full extent, thereby opening the by-pass 41 and shutting off the water to the radiator core. The line 36 is also closed to the vacuum line 33, so that the generator absorbs very little heat from the exhaust gas. It should be kept in mind that the thermostat operation just described is not a quick movement but, on the contrary, is gradual due to the gradual variations in temperature, and that the use of vacuum as a source of power increases the speed of operation of the valve 27 and doors 20 many times over that which would be obtainable if they were connected mechanically to the thermostat 31.

From the foregoing it will be seen that the range of heat available is sufficient to take care of that required in extremely cold weather and also that when the temperature calls for same, the amount of heat conducted to the unit is reduced to practically nothing. This is accomplished by regulating both the temperature and amount of fluid supplied to the radiator. The conventional conditioning unit regulates neither of these important elements.

Referring to Figure 3, I have shown a simpler construction which includes means for accelerating the movement of the thermostat upon the entrance of cold air into the car. It often happens, especially in the wintertime, that the car will be driven for some time with the wind. The conditioning unit will adjust itself to supply the heat required. If now the car is turned into the wind, almost twice the amount of heat will immediately be necessary to maintain the temperature within the car. This is due partly from air entering the windows, etc. and partly from the increased amount entering the cowl opening. If it were necessary to wait until the temperature of the car had lowered sufficiently to operate the thermostat, then the car would be uncomfortably cold by the time an increased supply of heat was provided.

In order to provide for this contingency, I have provided a passageway 42 which extends from the housing 17 above the radiator 21 to position adjacent to the thermostat 31. A butterfly valve 43 is interposed in the passageway 42 and is operated by a thermostat 44 positioned beneath the radiator core. When an increased amount of cold air is suddenly conducted into the cowl ventilator so as to upset the equilibrium previously established, it is of course forced through the radiator and comes out at a considerably lower temperature than that at which the smaller amount of air had previously emerged. The colder temperature of air immediately operates the thermostat 44, which opens the valve 43 and permits cold air to flow through the passageway 42 directly on the thermostat 31. The thermostat 31 is thus immediately contracted. The thermostat 31 is in this case connected to a vacuum valve 69 which operates the piston and cylinder unit 39, thereby closing the doors 20 to restrict the entrance of outside air. In this way extra heat is supplied to the car to compensate for the increased quantity of air entering the conditioning unit before the car temperature as a whole has been reduced to that which it would attain if there were no auxiliary control device.

Means will now be described for providing better air circulation within the car under all operating conditions. A conduit 45 is connected to one side of the housing 17 just above the radiator core 21, which conduit extends upwardly and rearwardly substantially parallel with the windshield of the vehicle. Air, after being put under pressure by the blower 22, may flow upwardly through the conduit 45 or downwardly through the radiator core. The area of the conduit 45 is substantially the same as that of the nozzle 23 so that about half the air propelled by the blower 22 is blown upwardly along the roof of the car, as shown by arrows 46, the remainder of the air flowing down through the radiator core where it is discharged along the floor.

An unexpected result is obtained from the foregoing arrangement. By dividing the air stream so that only a portion thereof passes through conduit 45 and nozzle 23, a 70 per cent increase air output into car is obtainable. No increased power is required to drive the fan.

When the conduit 45 is closed, 229 C. F. M. is discharged through the nozzle 23. This is the normal amount of air that a blower of the size shown will force through a conventional radiator core. If now the valve in conduit 45 is opened, the velocity of air discharged from the nozzle is reduced to 208 C. F. M., but air is discharged through the conduit 45 at the rate of 185 C. F. M. The total amount of air entering the car with the conduit opened is therefore 393 C. F. M. This is an increase of 70 per cent over the best results heretofore obtainable in car heaters.

It should be kept in mind that conduit 45 is rectangular, being as wide as the diameter of the motor fan. An unrestricted passage is thus provided which produces the increased air output. When the vehicle is traveling, the forward movement of the vehicle further increases the flow of air into the car.

If the car were started up in cold weather, an uncomfortable condition would result when the air at outside temperature was blown along the roof of the car. Consequently, I have provided means for closing the conduit 45 when the air in the car is below a predetermined temperature—namely, 55 degrees F. In this case, all the air propelled by the fan 22 will be forced through the radiator core. In this construction a valve 47 is provided in a vacuum line 48, which line extends to a piston and cylinder unit 49. This unit is mechanically connected to a butterfly valve 50 in the conduit 45. A thermostat 51 actuates the valve 47. The thermostat 51 remains closed at all times that the temperature is below 55 degrees, so that the vacuum is shut off from the piston 49 by means of the valve 47. When the thermostat 51 expands, then the piston is drawn inwardly to open the valve 50, thereby permitting cold air to be discharged over the heads of the passengers.

The air discharged at this time by the fan 22 is tempered with air entering through the openings 19, so that it is not as cold as outside air would be.

Figure 4:
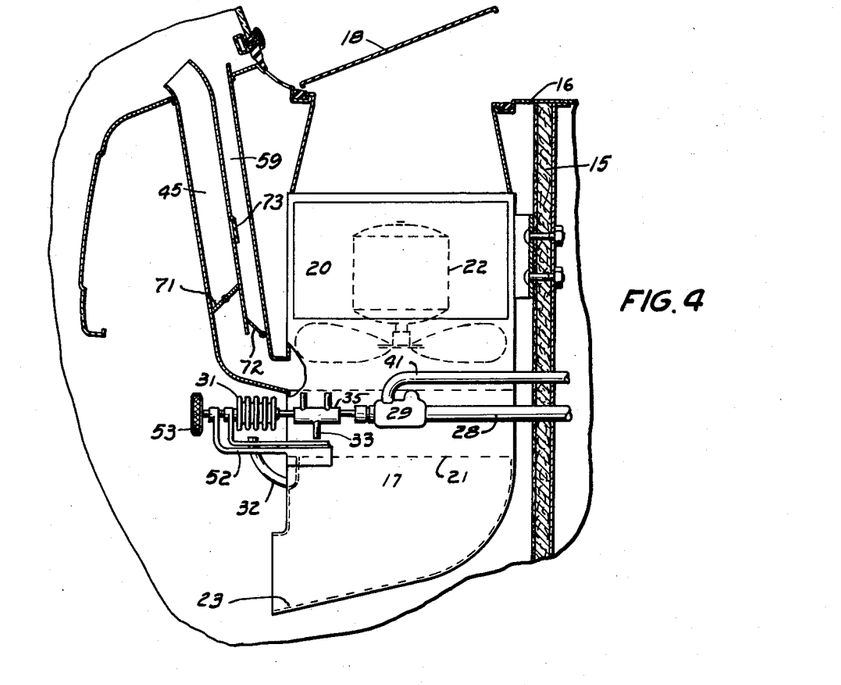
Figure 4 is a vertical side elevation of the preferred form of my improved unit, parts of the construction being broken away to better illustrate the construction.

Figure 4 of the drawings shows the actual construction employed, the doors 20 in this installation being disposed on opposite sides of the housing instead of at the forward and rearward edges, as shown in diagrammatic view. The thermostat 31, vacuum valve 35 and fluid valve 29 are installed in a horizontal line upon a bracket 52. An adjusting screw 53 is provided which moves the thermostat bodily towards and from the aforementioned valves. The desired temperature may be had by turning the screw 53 in either direction to cause a change in temperature.

Figure 5:
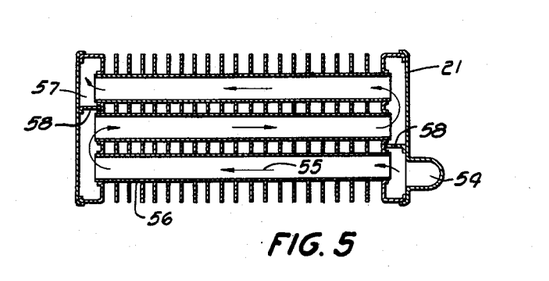
Figure 5 is a sectional view, taken upon the line 5—5 of Figure 4, illustrating the construction of the radiator core provided in this unit.

The radiator core used in the heater is shown in Figure 5, from which it will be noted that the water or vapor enters through a port 54 from the valve 29 and follows the path shown by arrows 55. The vapor flows through the lower row of radiator tubes 56 and then reverses itself through the middle row and finally returns to the outlet port 57 through the upper row of tubes. Horizontally extending baffles 58 direct the flow of fluid through the radiator tubes, as above described. This core has 54 tubes in three rows, one above the other, with 18 tubes in each row. This type of construction increases the even flow of heat from core 21 because the liquid passes through 17 tubes with greater rapidity than if same were conducted to all 54 tubes.

It will be also noted from Figure 4 that a defroster conduit 59 is formed integrally with the conduit 45, the purpose of which is to conduct a portion of the air propelled by the blower 22 upwardly against the windshield. This does not take the place of the conduit 45, as this latter conduit functions to conduct a major portion of the air along the roof of the car. Conduit 59 may be used for either defrosting or overhead cooling, or it may be used to refresh the air at breathing level. Above 32° F. outside unheated air may be used to remove fog from the windows. I show a valve 71 in conduit 45 which is manually closed when defrosting. A valve 72 is also shown in conduit 59, which may be used for controlling air flow for removing fog. I also show a valve 73 between conduit 45 and 59. This automatically opens when valve 71 in conduit 45 is open, thereby allowing both conduits to be used for overhead circulation. High velocity is maintained in conduit 45 which is very necessary in order that the cold outside unheated air may reach the rear compartment and also cause a warm stream of hot air to flow under the front seat, resulting in an even temperature in both compartments. Only by rapid circulation of air in both compartments is it possible to maintain an even temperature, so that the thermostat governing the flow of heating liquid may be able to control within a reasonable degree of accuracy the car temperature.

Referring to Figure 6, I have shown an alternate construction in which a conduit 60 extends from the housing 17 from position beneath the radiator core 21 upwardly to the windshield. With this construction warm air is blown up against the windshield to defrost same while the tempered air is used in the circulating system. Otherwise, the construction is substantially the same as that shown in Figure 4.

Figures 7 and 8 illustrate in detail the construction employed in the vacuum valve 35 and the fluid valve 29. It will be seen that the vacuum valve is of the balanced type so that the vacuum has no effect upon the operation of the thermostat. The fluid valve is not affected by pressure because the pressure used in the engine cooling system is negligible.

Figure 9:
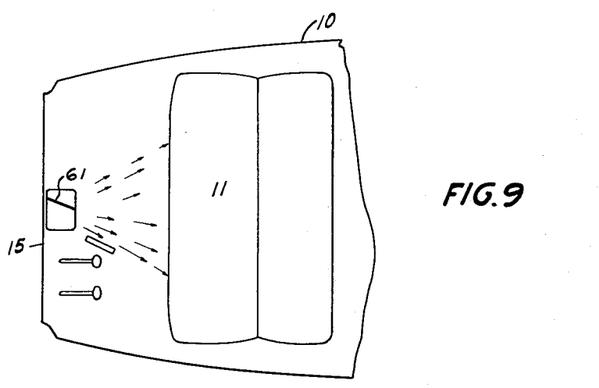
Figure 9 is a diagrammatic view, illustrating a deflector vane associated with my improved unit, which directs the main portion of the heated air discharged therefrom rearwardly at a slight angle.

Referring to Figure 9, I have shown in more or less diagrammatic form a baffle plate 61 which is placed in the nozzle 23 to direct the major portion of the air in an angular direction against the driver's feet. Air is directed at high velocity rearward between the two front passengers and directly under their legs, striking slightly forward of the front seat at the floor. This causes an even stream of heated air to pass under the front seat with about one-half of the directed air flow striking the lower front seat cushion which half rebounds forwardly, thereby maintaining an even temperature in both compartments.

Figure 10:
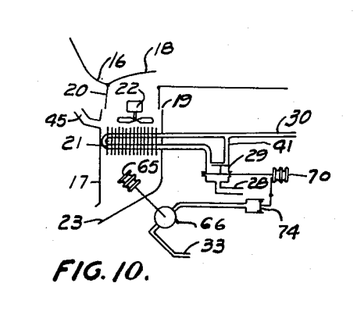
Figure 10 is a diagrammatic view, showing still another form of control mechanism for my improved unit.
Figure 11:
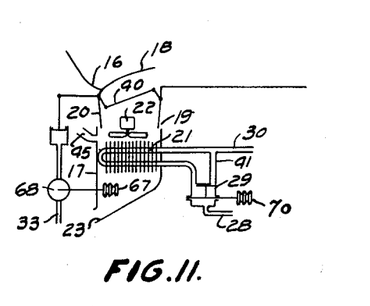
Figure 11 is a diagrammatic view, illustrating an alternate device for regulating the amount of incoming air by the temperature of the air after it leaves the heating radiator.

Figures 10 and 11 illustrate optional control arrangements which may be used if desired.

In the construction shown in Figure 10 the vacuum valve 66 operates a piston and cylinder to automatically put pressure upon the thermostat 70. When the car is driven at a constant speed of 50 or 60 miles per hour, the heating liquid through core 21 flows at high velocity, sufficient to take care of the amount of heat required. Valve 29 is then slightly open, so that only a small amount of liquid passes through same. Should the car stop abruptly for a stop light and then resume its course, the above-stated balanced operation will become unbalanced because the heating liquid circulated by the engine pump has slowed down to a very considerable extent. However, the air passing through core 21 from an outside temperature of, say, 10 degrees above zero will cool the air passing through the core down below the desired temperature, causing a draft through nozzle 23. Thermostat 70 does not respond quickly enough to meet this condition. Thermostat 65 is adjusted to act above 70° F., so that when the temperature is below this point a valve 73 opens the vacuum passage in line 33, causing a piston 72 to open valve 29. As soon as valve 29 is open, hot air flows from core 21, causing thermostat 65 to close again. This operation may be repeated any number of times until thermostat 70 becomes adjusted to the air change.

Figure 11 shows still another alternate construction wherein an auxiliary thermostat 67 is positioned within the housing 17 just beneath the core 21, which thermostat actuates a vacuum valve 68 which controls the supply of vacuum to directly operate the doors 20. The constructions shown in Figures 10 and 11 are variations of the basic control shown in the first construction and are recommended for use only where the additional expenditure is not objectionable. Thermostat 67 in this construction prevents a cold draft passing out of nozzle 23 by closing doors 20, thereby shutting off cold air from the outside. When thermostat 70 has been affected by a change of air in both compartments, thermostat 67 again opens the door 20, allowing cold air to come in from the outside to pass through core 21. Through this manner of operation satisfactory results are obtained.

Throughout this specification vacuum control means is shown. However, there are other methods of controlling both the air and the circulating heating liquid. In the claims the term thermostatic control is intended to cover broadly any combination of thermostat with air, electrical or other means.

Among the many advantages arising from the use of my improved air conditioner, it may be well to mention that when a relatively large volume of air is ejected at high velocity along the floor of the car and simultaneously, a similar volume of tempered air is directed along the roof of the car, ventilation of the air over the full area of the car is provided. An advantage in comfort results because the air which is breathed by the passengers is only tempered so that its freshness is not impaired, while the air which supplies the heat is not supplied for breathing.

Comparing this construction with old style heaters which are fastened to the dash and in which air is forced through the radiator core, it should be noted that even with a high velocity fan air will not circulate to the rear compartment. The air coming out of the core is still at a low velocity, and therefore the front compartment will become unbearably hot. Certain heaters are provided with adjustable doors. However, the closing of one of the doors will not increase the velocity of the air coming out to any considerable extent, as the portion of the radiator, which is then covered by the closed door, would be chocked off.

An important feature of this construction is the ejecting nozzle which conducts all the air passing through the core without restriction to one outlet. This outlet is considerably smaller than the area of the core, thereby creating a static pressure. Through this means I am able to move the air underneath the front seat and distribute it evenly in the rear compartment. The front compartment is evenly heated because the ejecting nozzle forces the air against the lower portion of the front cushion. This causes the heated air to rebound forwardly, thereby heating the front compartment evenly. This method of circulation produces an increased B. t. u. output for a given size heating radiator core, resulting in a more compact and desirable heating unit.

Still a further advantage results in that means is provided for regulating the amount of heat conducted to the radiator while maintaining a constant circulation of air in the car. In the conventional car heater the maximum amount of heat available is invariably supplied to the radiator of the car, and the volume of air which is being forced through the radiator is varied to vary the temperature. The conventional construction has the disadvantage that, unless maximum circulation is obtained, the ventilation of the car is seriously impaired.

A further advantage of my construction results from employing vacuum operated pistons for actuating the various valves in the unit, the vacuum alone being controlled by the action of the thermostat. Thus positive actuation of the valves is obtained even with small variations in movement of the thermostat.

Still a further advantage results in that the provision of an auxiliary control located within the housing of the conditioner causes an immediate response to sudden variations in the volume of air entering the conditioner. The conditioner thereby supplies added heat to the unit before the temperature of the car has been appreciably affected by the incoming air.

Some changes may be made in the arrangement, construction and combination of the various parts of my improved conditioning unit without departing from the spirit of my invention, and it is my intention to cover by my claims such changes as may reasonably be included within the scope thereof.

I claim as my invention:

1. An air conditioning unit for use in motor vehicles comprising, a housing positioned beneath an opening in the cowl of said vehicle, said housing having a radiator positioned therein and having openings therein between said radiator and said vehicle cowl, means for supplying heated fluid to said radiator, an operable valve mounted in said housing which in one position closes said cowl opening and in another position closes said housing opening, a fan positioned within said housing between the openings therein and said radiator, said fan circulating air from either or both of said openings through said radiator, means for regulating the amount of fluid supplied to said radiator, and a thermostat responsive to the temperature of the air within the vehicle simultaneously actuating both said valve and said fluid regulating means.

2. An air conditioning unit for use in a motor vehicle comprising, a housing positioned beneath an opening in the cowl of said vehicle, said housing having a radiator positioned therein and having an opening therein between said radiator and said cowl, an operable valve mounted in said housing, which in one position closes said cowl opening and in another position closes said housing opening, a fan positioned within said housing between the opening therein and said radiator, said fan circulating air from said openings through said radiator, vacuum operated means for regulating a supply of heated fluid to said radiator, and a thermostat responsive to the temperature within said vehicle controlling the vacuum to said vacuum operated means.

3. An air conditioning unit for use in motor vehicles comprising, a housing positioned beneath an opening in the cowl of said vehicle, a radiator positioned in said housing, said housing having an opening therein between said radiator and said vehicle cowl, means for supplying heated fluid to said radiator, an operable valve mounted in said housing which in one position closes said cowl opening and in another position closes said housing opening, a fan positioned within said housing between said housing opening and said radiator, said fan circulating air from one or both of said openings through said radiator at a substantially fixed velocity, vacuum operated means for regulating the amount of heat supplied to said radiator by said heated fluid, vacuum operated means for moving said valve from one of its positions to its other position, and a thermostat responsive to the temperature within said vehicle for controlling the vacuum to both of said vacuum operated means.

4. An air conditioning unit for use in motor vehicles comprising, a housing positioned beneath an opening in the cowl of said vehicle, a radiator positioned in said housing, said housing having an opening therein between said radiator and said cowl, an operable valve mounted in said housing which in one position closes said cowl opening and in its other position closes said housing opening, a fan positioned within said housing between its opening therein and said radiator, a conduit intersecting the side of said housing at a point between said radiator and said fan, means for operating said fan to draw air through either or both of said openings, a portion of the air expelled by said fan being conducted through said conduit with the remainder of the air expelled by said fan being forced through said radiator, means for conducting the air discharged through said conduit rearwardly in the vehicle along the inside of the vehicle roof, and means for conducting the air discharged from said radiator rearwardly in said vehicle along the floor thereof.

5. An air conditioning unit for use in motor vehicles comprising, a housing positioned beneath an opening in the cowl of said vehicle, a radiator positioned in said housing, said housing having an opening therein between said radiator and said vehicle cowl, means for supplying heated fluid to said radiator, an operable valve mounted in said housing which in one position closes said cowl opening and in another position closes said housing opening, a fan positioned within said housing between the opening in said housing and said radiator, said fan circulating air from one or both of said openings through said radiator, a thermostat disposed within the passenger compartment of the vehicle for increasing the amount of heat supplied to said radiator upon a reduction in vehicle temperature, and an auxiliary thermostat positioned in the path of the air as it leaves said radiator, which also increases the amount of heat supplied to said radiator upon a reduction in the temperature of the air leaving said radiator.

6. An air conditioning unit for use in motor vehicles comprising, a housing positioned beneath an opening in the cowl of said vehicle, a radiator positioned in said housing, said housing having an opening therein between said radiator and said vehicle cowl, a door hinged to said housing which in one position closes said cowl opening and opens said housing opening, and in its other position closes said housing opening and opens said cowl opening, means for supplying heated fluid to said radiator, thermostatically operated means for regulating the amount of heat supplied to said radiator by the temperature of the air within said vehicle, and thermostatically operated means for operating said door so as to close said cowl opening upon the air from said radiator dropping to a predetermined temperature.

7. An air conditioning unit for use in motor vehicles comprising, a housing positioned beneath an opening in the cowl of said vehicle, a radiator positioned in said housing, said housing having an opening therein between said radiator and said cowl, a door mounted in said housing which in one position closes said cowl opening and in another position closes said housing opening, a fan positioned within said housing between the opening therein and said radiator, a thermostatically operated valve controlling the flow of heated fluid to said radiator, said thermostat being responsive to the temperature of the air within said car, a second thermostat mounted within said housing in the path of said radiator which operates a fluid valve, and a pressure operated piston connected to said door to open and close same, which piston is controlled by fluid which is regulated by said fluid valve, whereby upon a drop in temperature of the air leaving said radiator said piston will close said door over said cowl opening.

8. An air conditioning unit for use in motor vehicles comprising, a housing, a radiator disposed within said housing, means for forcing air through said housing and radiator, means for supplying heated fluid to said radiator, a conduit extending from said housing upwardly and substantially parallel to the inside surface of the vehicle windshield, said conduit intersecting said housing at a point between said air forcing means and the radiator core, a longitudinal partition in said conduit, a manually operated valve in each of the passageways formed by said partition, one of the said passageways directing air upwardly and rearwardly in said vehicle, while the other of said passageways directing air against the windshield of the vehicle, for the purpose described.

9. An air conditioning unit for use in motor vehicles comprising, a housing positioned beneath an opening in one cowl of said vehicle, a radiator within said housing, said housing having an opening therein between said radiator and said vehicle cowl, valve mechanism within said housing which in one position closes said cowl opening and opens said housing opening and in another position closes said housing opening and opens said cowl opening, a fan positioned within said housing between said housing opening and said radiator, a conduit extending from said housing at a point between said radiator and said fan, means for operating said fan to draw air through either or both of said openings, a portion of the air expelled by said fan being conducted through said conduit with the remainder of the air expelled by said fan being forced through said radiator, means for conducting the air discharged through said conduit upwardly and rearwardly in said vehicle, and means for conducting the air discharged from said radiator downwardly and rearwardly along the floor of said vehicle.

10. An air conditioning unit for use in motor vehicles comprising, a housing positioned beneath an opening in the cowl of said vehicle, a radiator within said housing, a fan within said housing disposed between said radiator and said cowl opening, a conduit intersecting the side of said housing at a point between said radiator and said fan, means for operating said fan to draw air through said cowl opening, a portion of which is propelled by said fan through said conduit with the remainder of the air being forced by the said fan through said radiator, means for conducting the air discharged through said conduit rearwardly in the vehicle along the inside of the vehicle roof, and means for conducting the air discharged by said radiator rearwardly in said vehicle along the floor thereof.

11. An air-conditioning unit for use in motor vehicles comprising a housing positioned beneath an opening in the cowl of said vehicle, a radiator positioned in said housing, said housing having an opening therein between said radiator and said cowl, a fan positioned within said housing between its opening therein and said radiator, a conduit intersecting the side of said housing at a point between said radiator and said fan, means for operating said fan to draw air through either or both of said openings, a portion of the air expelled by said fan being conducted through said conduit with the remainder of the air expelled by said fan being forced through said radiator, means for conducting the air discharged through said conduit rearwardly in the vehicle along the inside of the vehicle roof, and means for conducting the air discharged from said radiator rearwardly in said vehicle along the floor thereof.

12. That method of air-conditioning the interior of a closed vehicle which includes the steps of admitting into the vehicle interior fresh outside air and discharging the same from a point inside the interior forwardly thereof and above a zone or strata lying intermediate the floor and roof of the vehicle in such manner that it flows upwardly and rearwardly along the under side of the vehicle roof, simultaneously discharging heated air into the vehicle interior from a point similarly located, but positioned below said intermediate zone, in such manner that it flows downwardly and rearwardly along the upper side of the vehicle floor, thus causing the heated air and the fresh air from outside the vehicle interior to mix in said intermediate zone at the rear of said vehicle interior, returning the mixture forwardly along said intermediate zone, heating the mixture at the forward end of said interior, discharging the same downwardly and rearwardly as aforesaid, and controlling the temperature of the air so discharged downwardly and rearwardly substantially in accordance with the temperature of the air so discharged.

13. That method of air-conditioning the interior of a closed vehicle which includes the steps of admitting fresh outside air into the interior of the vehicle to a point at the forward end thereof and lying in a zone intermediate the floor and roof, discharging a portion of such outside air from a point inside the interior forwardly thereof and above a zone lying intermediate the floor and roof of the vehicle in such manner that it flows upwardly and rearwardly across the under side of the vehicle roof, heating another portion of the air so admitted and simultaneously discharging it into the vehicle interior from a point similarly located but positioned below said intermediate zone in such manner that it flows downwardly and rearwardly along the upper side of the vehicle floor, returning said mixture from the rear of said interior forwardly along said intermediate zone, heating the mixture at the forward end of said interior, and discharging the same downwardly and rearwardly as aforesaid.

14. That method of air conditioning the interior of a closed vehicle which includes the steps of admitting into the vehicle interior fresh outside air and discharging part of the same from a point inside the interior forwardly thereof and above a zone or strata lying intermediate the floor and the roof of the vehicle in such manner that said part flows upwardly and rearwardly along the under side of the vehicle roof, simultaneously mixing the remainder of said fresh air with some air from within the vehicle and discharging it heated into the vehicle interior from a point similarly located but positioned below said intermediate zone in such manner that it flows downwardly and rearwardly along the upper side of the vehicle floor, thereby causing the unheated and the heated air to flow together in said intermediate zone at the rear of said vehicle interior, returning the combined stream forwardly along said intermediate zone, heating the combined stream together with added fresh outside air at the forward end of said interior and discharging the same downwardly and rearwardly as aforesaid.

EDMUND E. HANS.